(12) United States Patent
Lister et al.

(10) Patent No.: US 8,897,976 B2
(45) Date of Patent: Nov. 25, 2014

(54) SYSTEM AND METHOD FOR MACHINE LOAD DETECTION

(75) Inventors: Brian Lister, Edwards, IL (US); Christopher Rhoades, Metamora, IL (US); Michael Beyer, Chillicothe, IL (US); Michael Barngrover, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 249 days.

(21) Appl. No.: 13/484,632

(22) Filed: May 31, 2012

(65) Prior Publication Data
US 2013/0325271 A1 Dec. 5, 2013

(51) Int. Cl.
*B60W 10/10* (2012.01)

(52) U.S. Cl.
USPC ............. 701/54; 701/50; 701/51; 701/67; 701/110; 477/34; 477/37; 477/110; 477/180; 477/181

(58) Field of Classification Search
CPC ............ B60W 2510/105; B60W 2520/10; B60W 2540/10; B60W 10/02; B60W 10/11; B60W 10/30; B60W 30/18
USPC ............. 701/50, 51, 54, 55, 67, 110, 115; 477/34, 37, 43, 110, 180, 181
See application file for complete search history.

(56) References Cited

U.S. PATENT DOCUMENTS

| | | | |
|---|---|---|---|
| 4,976,665 A | 12/1990 | Hagin et al. | |
| 5,730,678 A | 3/1998 | Larkin | |
| 6,188,943 B1 | 2/2001 | Uchida et al. | |
| 6,450,912 B2 | 9/2002 | Todeschini | |
| 6,640,179 B2 | 10/2003 | Katakura et al. | |
| 7,204,787 B2 | 4/2007 | Maekawa et al. | |
| 7,220,210 B2 | 5/2007 | Soh | |
| 7,402,119 B2 | 7/2008 | Kamada et al. | |
| 7,433,770 B2 * | 10/2008 | Inagawa et al. | 701/51 |
| 7,488,269 B2 | 2/2009 | Tabata et al. | |
| 7,524,255 B2 | 4/2009 | Matthews | |
| 7,561,951 B2 * | 7/2009 | Rao et al. | 701/48 |
| 7,873,457 B2 * | 1/2011 | Christofl et al. | 701/67 |
| 7,905,810 B2 | 3/2011 | Hukill et al. | |
| 7,912,617 B2 | 3/2011 | Wright et al. | |
| 7,950,273 B2 * | 5/2011 | Assaf et al. | 73/114.12 |
| 8,036,797 B2 * | 10/2011 | Johnson et al. | 701/50 |
| 8,326,499 B2 * | 12/2012 | Sopko et al. | 701/50 |
| 8,424,507 B2 * | 4/2013 | Reedy | 123/320 |
| 8,452,500 B1 * | 5/2013 | Seipold | 701/55 |
| 8,565,985 B2 * | 10/2013 | Nakagawa et al. | 701/50 |
| 8,577,562 B2 * | 11/2013 | Tochizawa et al. | 701/50 |

(Continued)

FOREIGN PATENT DOCUMENTS

| | | |
|---|---|---|
| KR | 100779482 | 11/2007 |
| WO | 2008127528 | 10/2008 |

*Primary Examiner* — John R Olszewski
*Assistant Examiner* — Truc M Do
(74) *Attorney, Agent, or Firm* — Leydig, Voit & Mayer, Ltd.

(57) ABSTRACT

A transmission includes a transmission output speed (TOS) sensor providing a signal indicative of an output speed of the transmission. A controller estimates an actual torque output of the transmission and determines, in real time, a first TOS acceleration based on the signal provided by the transmission output speed sensor and a second TOS acceleration based on the actual torque estimation. The first and second accelerations are compared and a torque transient trigger is activated when the divergence exceeds a threshold value.

20 Claims, 6 Drawing Sheets

(56) References Cited

U.S. PATENT DOCUMENTS

| | | |
|---|---|---|
| 2005/0101426 A1 | 5/2005 | Sugino et al. |
| 2006/0056481 A1* | 3/2006 | Melby et al. .................. 374/1 |
| 2007/0037660 A1* | 2/2007 | Shishido et al. ............. 477/74 |
| 2008/0081735 A1* | 4/2008 | Runde ........................ 477/107 |
| 2009/0036248 A1 | 2/2009 | Mueller et al. |
| 2009/0062056 A1 | 3/2009 | Kato et al. |
| 2009/0120175 A1* | 5/2009 | Assaf et al. ............. 73/114.12 |
| 2009/0186741 A1* | 7/2009 | Lane et al. ..................... 477/3 |
| 2009/0234534 A1* | 9/2009 | Stempnik et al. ............ 701/34 |
| 2009/0282709 A1* | 11/2009 | Fukaya ........................ 37/403 |
| 2010/0168976 A1* | 7/2010 | Andrasko et al. ............ 701/70 |
| 2010/0256877 A1* | 10/2010 | Nakagawa et al. ........... 701/50 |
| 2010/0304912 A1 | 12/2010 | Sime |
| 2010/0312440 A1* | 12/2010 | Ellis et al. .................... 701/54 |
| 2010/0323843 A1 | 12/2010 | Wittkopp et al. |
| 2012/0003070 A1* | 1/2012 | Tochizawa et al. ......... 414/685 |
| 2012/0330515 A1* | 12/2012 | Numazaki et al. ............ 701/50 |

* cited by examiner

SYSTEM AND METHOD FOR MACHINE LOAD DETECTION

TECHNICAL FIELD

This patent disclosure relates generally to transmissions appropriate for use in vehicle and machine powertrains and, more particularly, to continuously variable transmissions.

BACKGROUND

Various vehicles or machines such as wheel loaders, cars, trucks and other wheeled machines, use powertrains that include a torque converter between the engine and transmission. The torque converter can be used in a locked or an unlocked mode when the machine is moving, which provides for a desirable torque control feature for some machines that may encounter relatively immovable obstacles. For example, a wheel loader may push a bucket against a pile of material, a ripper may encounter a boulder, and so forth. Torque converter slippage is relied upon to provide a transmission output torque control benefit, for example, when contact with the obstacle is initiated, because it results in limiting transmission input torque and reducing the possibility of low engine lug issues, such as engine underspeed or stalling. However, torque converter slippage and other losses have been found to increase overall fuel consumption of the machine when compared to other power transmission methods such as continuously variable transmissions (CVTs).

CVTs provide a continuously variable torque capability, which is an improvement over a traditional toque converter/transmission powertrains. A typical CVT employs a torque controlling element that provides a continuously variable torque or speed transmission capability. One known application of CVTs for machine use is embodied as a split torque transmission, which includes a drive train that is powered by dual inputs—one input being a torque- or speed-controlled input, such as from a hydraulic variator, and the other being a direct power input from an engine. These two inputs are combined in one or more planetary gear arrangements, each of which includes outputs driving the various gear ratios of the transmission.

In split torque transmissions, it is desirable to accurately control the variator, especially when rapid changes in the torque passing through the transmission occur, for example, when an obstacle is encountered. Control of the variator under such conditions requires the swift detection of torque changes, which in most current implementations is left to the perception of the operator. Thus, in most current implementations, the operator must cut or reduce machine torque when the operator perceives that an immovable object has been encountered. As can be appreciated, there is a lag time between the instant when the machine begins to encounter the obstacle until the time when the operator has sufficiently reduced the torque command to the transmission and the transmission has adjusted its operation accordingly. This time lag may cause the machine to rock, thus causing operator discomfort, system inefficiency, and/or increased drive train wear. In some instances, such time lag may cause engine underspeed and/or stall.

SUMMARY

In one aspect, the disclosure describes a powertrain having an engine connected to a transmission adapted to drive ground engaging members. The powertrain includes a transmission output speed (TOS) sensor disposed to provide a signal indicative of a speed of an output of the transmission. A controller is configured to control operation of the transmission based on a desired torque output of the transmission by, at least in part, estimating an actual torque output of the transmission and using the actual torque estimation as a control feedback. The controller is further configured to determine, in real time, a first TOS acceleration based on the signal provided by the transmission output speed sensor, and a second TOS acceleration based on the actual torque estimation that is used as a control feedback. A divergence between the first and second TOS accelerations is determined and a torque transient trigger that is used to further control operation of the transmission is activated when the divergence exceeds a threshold value.

In another aspect, the disclosure describes a machine that includes a frame supporting an engine connected to a transmission. The transmission selectively transforms an input engine speed and engine torque to an output transmission speed and transmission torque, the transmission speed and torque being applied to a set of ground engaging members to propel the frame. A transmission output speed (TOS) sensor is disposed to provide a signal indicative of a speed of an output of the transmission, and a controller is configured to control operation of the engine and the transmission based on a desired torque output of the transmission by, at least in part, estimating an actual torque output of the transmission and using the actual torque estimation as a control feedback. The controller is further configured to determine, in real time, a first TOS based on the signal provided by the TOS sensor, calculate a first acceleration based on the first TOS, determine a second acceleration based on at least one of engine speed, engine torque, machine inertia, and on a setting. The controller is further configured to determine a divergence between the first and second accelerations and a rate of change of that divergence such that, when the rate of change of the divergence exceeds a threshold value, a control parameter that adjusts the transmission setting to avoid a decrease in engine speed below a threshold engine speed value is adjusted.

In yet another aspect, the disclosure describes a method for detecting transient torque changes in a transmission. The method includes monitoring a transmission output speed (TOS) of the transmission and determining a first TOS acceleration by calculating a derivative of the measured TOS. The method further includes estimating a torque at an output of the transmission, and determining a second TOS acceleration by dividing the estimated torque by a predetermined inertia of the machine. The first and second TOS accelerations are compared and, when a parameter related to a difference between the first and second TOS accelerations exceeds a threshold value, a torque transient change trigger is activated.

DETAILED DESCRIPTION

This disclosure relates to transmission controls and, more particularly, to a detector for detecting transient shifts in the torque passing through the transmission. The disclosed methods and systems are applicable not only to the CVT transmissions described in the disclosed embodiments, but to any other types of transmissions that may be operating in a torque-controlled fashion. In the description that follows, CVTs are discussed but it should be appreciated that any type of transmission operating in a torque-controlled fashion is contemplated.

Figure 1:
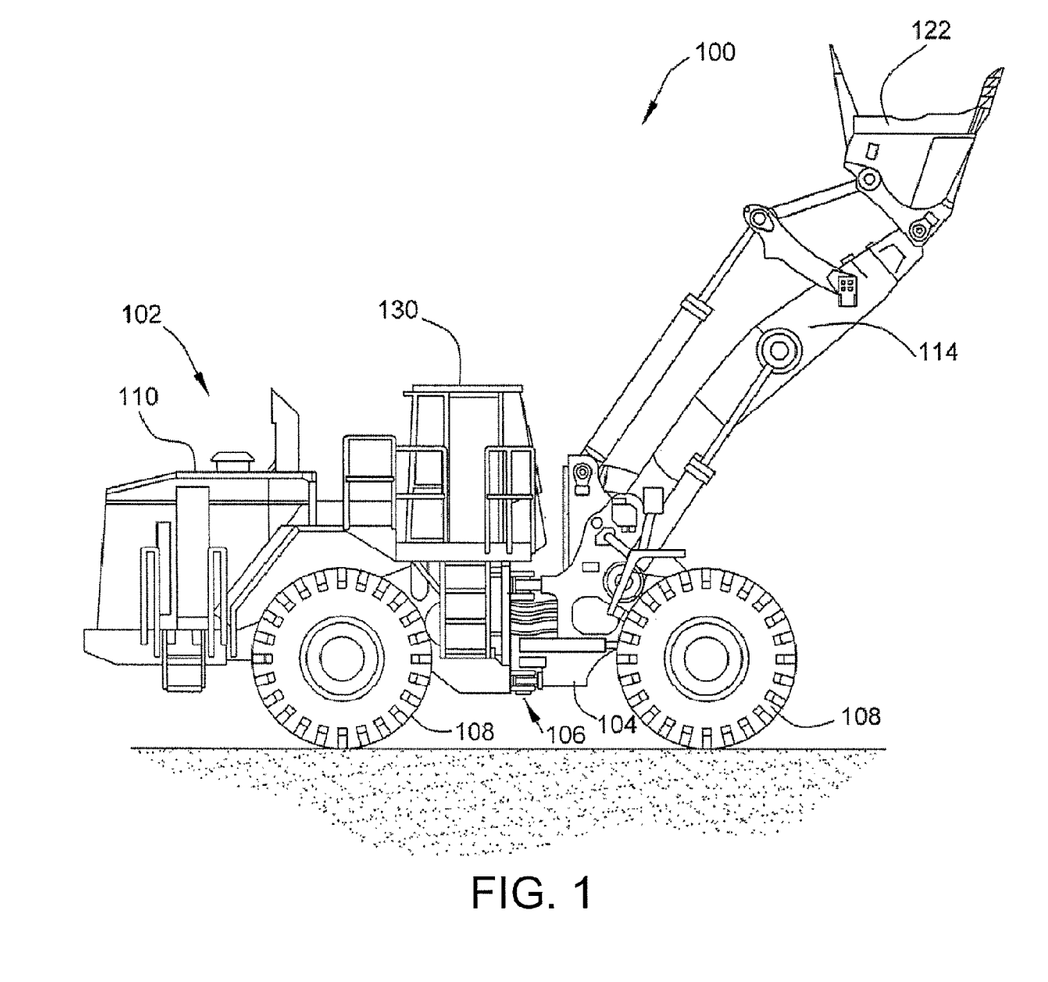
FIG. 1 is a schematic view of a machine in accordance with the disclosure.
Figure 2:
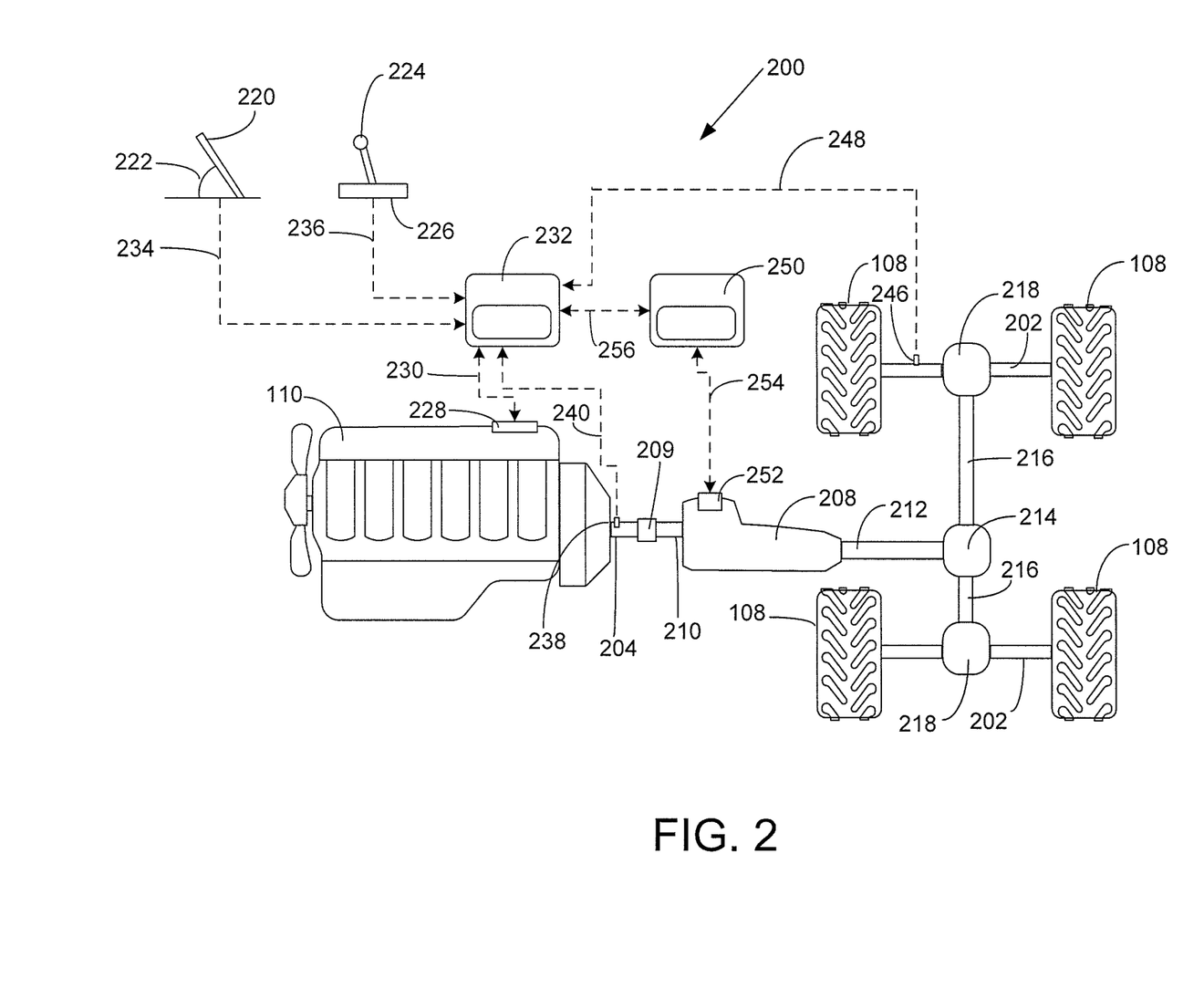
FIG. 2 is a schematic view of a powertrain for a machine in accordance with the disclosure.

FIG. 1 shows an outline of a wheel loader as one example of a vehicle or machine 100. FIG. 2 is a schematic of a powertrain 200 of the vehicle 100. In reference to these figures, the vehicle 100 includes an engine frame portion 102 connected to a non-engine frame portion 104 by an articulated joint 106. Each of the engine frame portion 102 and non-engine frame portion 104 includes a respective axle 202 connected to ground engaging members, in this case, a set of wheels 108. The engine frame portion 102 includes the engine 110, which has an output shaft 204 connected to a transmission 208 via a connecting shaft 210 and a coupling 209. An output shaft 212 of the transmission 208 is connected to a splitter 214 that powers two drive shafts 216, one for each axle 202. The transmission 208 is configured to selectively transform an engine speed and torque provided from the engine 110 at the connecting shaft 210 to a variable speed and torque at the output shaft 212, which is then applied to drive the ground engaging members or wheels 108. The transmission 208 may include a variator connected to a gear set, as discussed later relative to FIG. 3. Each drive shaft 216 transmits power to the wheels 118 via a respective differential 218 such that rotational power provided at the engine output shaft 204 is effectively transmitted to the wheels 108. Although two driven axles 202 are shown, a single axle or more than two axles may be used depending on the type of vehicle. Moreover, although wheels are shown, other types of ground engaging members, such as tracks, may be used.

The vehicle 100 further includes an operator cab 130 that houses various machine control devices. As shown in FIG. 2, such devices include an accelerator pedal 220 having an accelerator pedal sensor (APS) 222, and a gear selector lever 224 having a lever encoder 226. The APS 222 and lever encoder 226 may be configured to provide signals indicative of the desired ground speed of the vehicle 100 that is commanded by an operator during use.

Returning now to FIG. 1, the vehicle 100 of the illustrated embodiment includes a work implement, which in this case is a bucket 122 connected at the end of a pair of lift arms 114 that are pivotally connected to the non-engine frame portion 104 of the vehicle 100 at a hinge 116. As shown in FIG. 2, the engine 110 has an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control the operation of the engine.

In the illustrated embodiment, the governor 232 is an electronic controller that includes a processor operably associated with other electronic components such as a data storage device and the various communication channels. In the illustration of FIG. 2, a throttle communication channel 234 and a gear selection encoder communication channel 236 are connected to the governor 232 and configured to provide to the governor 232 information indicative of the operator's commands, such as the desired engine speed or load, the desired forward or reverse travel direction of the machine, a "neutral" or "park" setting of the machine transmission, and the like. It should be appreciated that additional or alternative connections between the governor 232 and the various engine and/or vehicle systems may be present but are not shown for simplicity.

The governor 232 is further configured to receive information indicative of the operation of the remaining portion of the powertrain 200. In this way, the governor 232 is connected to an engine output shaft speed sensor 238 via an engine speed communication channel 240, to a vehicle ground speed sensor 246 via a ground speed communication channel 248, and to other sensors, which are not shown for simplicity.

The powertrain 200 further includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250, as well as provide information to the transmission controller 250 indicative of the current gear engagement state of the transmission 208, and other information, such as the power transmitted to the wheels 108 through the transmission 208, the speed of the output shaft 212, the speed of the connecting shaft 210, and the like. During operation, the transmission controller 250 may command gear changes to the transmission 208 based on predetermined connecting shaft 210 speed thresholds for up-shift and downshift changes. Such gear changes may include command signals provided to the variator for adjusting the relative speeds of incoming and outgoing gears, operating in a spinning idle state, where no engine rotation is transferred through the transmission, and other operating conditions. In some conditions, the variator may be commanded to assume a position in which a torque at the output shaft is maintained while the engine shaft is essentially de-coupled from the output shaft of the transmission. This type of torque "holding" position can be commanded when, for example, a wheel loader has sufficiently pushed itself against an aggregate pile and the operator wishes to hold that position while the bucket is loaded. As can be appreciated, the holding torque in such instance is required to prevent the rolling of the machine away from the pile.

Figure 3:
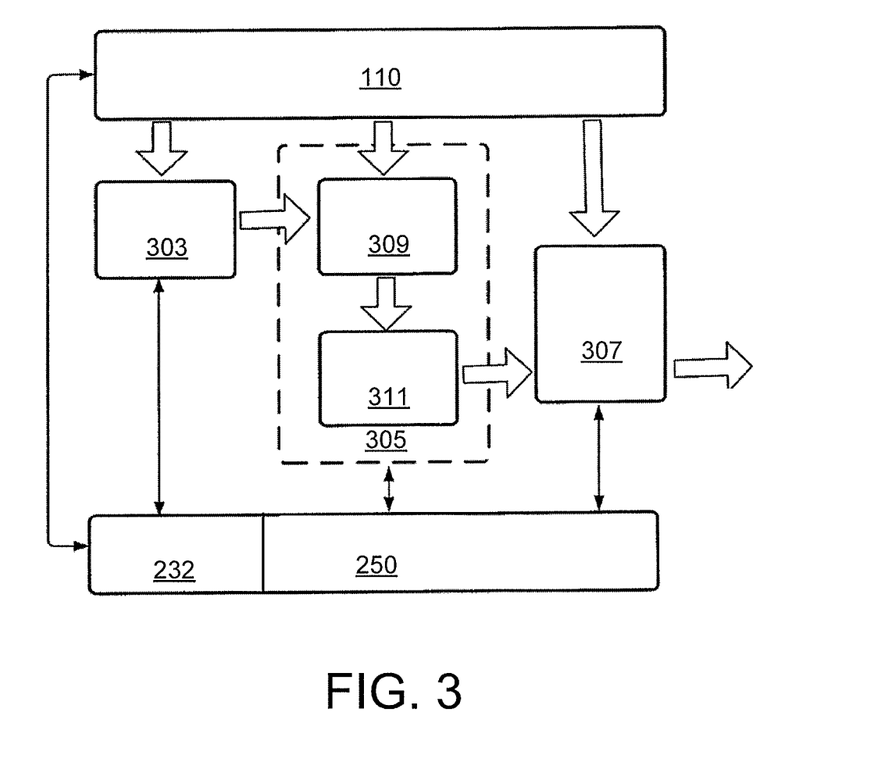
FIG. 3 is a block diagram of a powertrain in accordance with the disclosure.

A simplified schematic of the transmission 208 and the connections of the various components therein is shown in FIG. 3. As shown here, the engine 110, which in the illustrated embodiment acts as the prime mover for the system, is connected to and drives a main hydraulic pump 303. The main hydraulic pump 303 may be used to operate numerous components and systems of the machine such as actuators, work implements and the like. In the illustrated embodiment, the powertrain uses hydraulic power from the main hydraulic pump 303 to operate various functions of a propel system of the machine. Accordingly, hydraulic power from the main hydraulic pump 303 is provided to a variator 305, which is included within the transmission 208 (also see FIG. 2). Mechanical power from the variator 305 and from the engine 110 are provided to a set of transmission gears 307. The engine 110 also mechanically drives components of the variator 305 in the known fashion. In this way, the set of transmission gears 307 receives dual power inputs, one from the variator 305 and the other from the engine 110.

Various examples of variators operating in conjunction with transmissions can be found in U.S. application Ser. Nos. 13/407,280 and 13/407,311, both of which are incorporated herein in their entirety by reference. In a representative example of such structures, an output of the variator is connected to a ring gear of a planetary gear set. An engine input is connected to the planet gears of an additional planetary gear arrangement. The ring gear of the additional planetary gear arrangement is connected to the planet gears of the first planetary gear arrangement, while outputs from the sun gears of both planetary gear arrangements and the planet gears of the first planetary gear arrangements are used to run gears at various ratios of the transmission. During operation, shifts between various forward and reverse gear ratios are carried out at a relative speed of about zero between the outgoing and incoming gears. To this end, the variator is used to adjust the speed of the ring gear of the first planetary gear set such that the combined speed of an output member can be at a zero rotation speed when the machine or vehicle is stationary notwithstanding the rotational input provided by the engine to the planetary gear of the second planetary gear. The variator thus operates at a variable speed, in two directions, while the powertrain is active. In this way, a transmission setting may include a command to a variator actuator that sets the relative speed and direction of the variator during operation. It is noted that although a hydraulic variator is shown and described here, any other type of variator such as mechanical- or electrical-based variators may be used.

In the illustrated embodiment, the variator 305 is a hydrostatic-type variator that includes a variator pump 309 and a variator motor 311. During operation, the engine 110 drives the variator pump 309, which has a variable displacement capability and operates to circulate fluid through the variator motor 311. The transmission controller 250 monitors and controls operation of the various systems and components that are associated therewith, and the engine controller 232 monitors and controls engine operation. The two controllers 232 and 250 are shown together in this illustration for simplicity. It is contemplated that while the system illustrated in FIG. 3 is a split torque system, other types of system may instead be used. For example, the disclosed principles will also provide benefits within a simple direct series hydrostatic ("hystat") system, where an engine-driven pump supplies fluid to operate a motor that is connected to the input or output side of the transmission.

The engine 110 supplies power to the transmission gears 307 and the variator pump 309 via direct input, for example, the shaft 210 (FIG. 2) and also supplies power to the main hydraulic pump 303. The main hydraulic pump 303 supplies fluid via the fluid supply line to the variator 305. The power output of the system is provided by the transmission 307. During operation, the controller 250 receives operational data from the engine 110, variator 305, and transmission 307. The controller 250, along with the engine controller 232, control the operation of the engine 110, variator 305, and clutches or other (not shown) devices that engage and disengage one or more of the set of transmission gears 307 in response to this data, and in accordance with user input and potentially other information related to operating goals and/or conditions. The control of all these components and systems is carried out in a coordinated fashion based on command signals from the operator, which are provided in the form of a requested torque, and based on a calculated torque that is actually provided through the transmission as feedback.

Returning now to the illustration of FIG. 2, information for the coordinated control of the engine 110 and transmission 208 may be exchanged between the engine governor 232 and the transmission controller 250 via a data bus 256. Although the engine governor 232 and the transmission controller 250 are shown as separate components, it is contemplated that they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 110. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

The present disclosure is directed to systems and methods for the coordinated control of transmissions in a fashion that provides improved performance and operator comfort over previously proposed designs. Under certain operating conditions, especially when external loads occur such as pile hits, control of a continuously variable transmission (CVTs) can advantageously include quick detection of transient torque events. In some disclosed embodiments, torque transient events are detected based on a comparison between two independent measurements of an acceleration or deceleration in the transmission output speed. In one embodiment, one of the two independent measurements is accomplished based on signals from speed sensors disposed to directly measure transmission output speed. An application of a rate of change calculation or function to these signals provides the first independent measurement of transmission acceleration or deceleration. The second independent measurement of transmission output speed (TOS) acceleration or deceleration is based on the torque feedback of the CVT control system, which can include an estimated machine inertia for determining a machine acceleration or deceleration. By comparing the two independent TOS acceleration or deceleration parameters, and especially by determining and monitoring the deviation between the two parameters, transient torque changes can be effectively detected. One particular embodiment for an implementation of such a torque transient detection is shown in the schematic illustrations that follow after an illustrative graphical representation of the parameters considered is presented.

Figure 4:
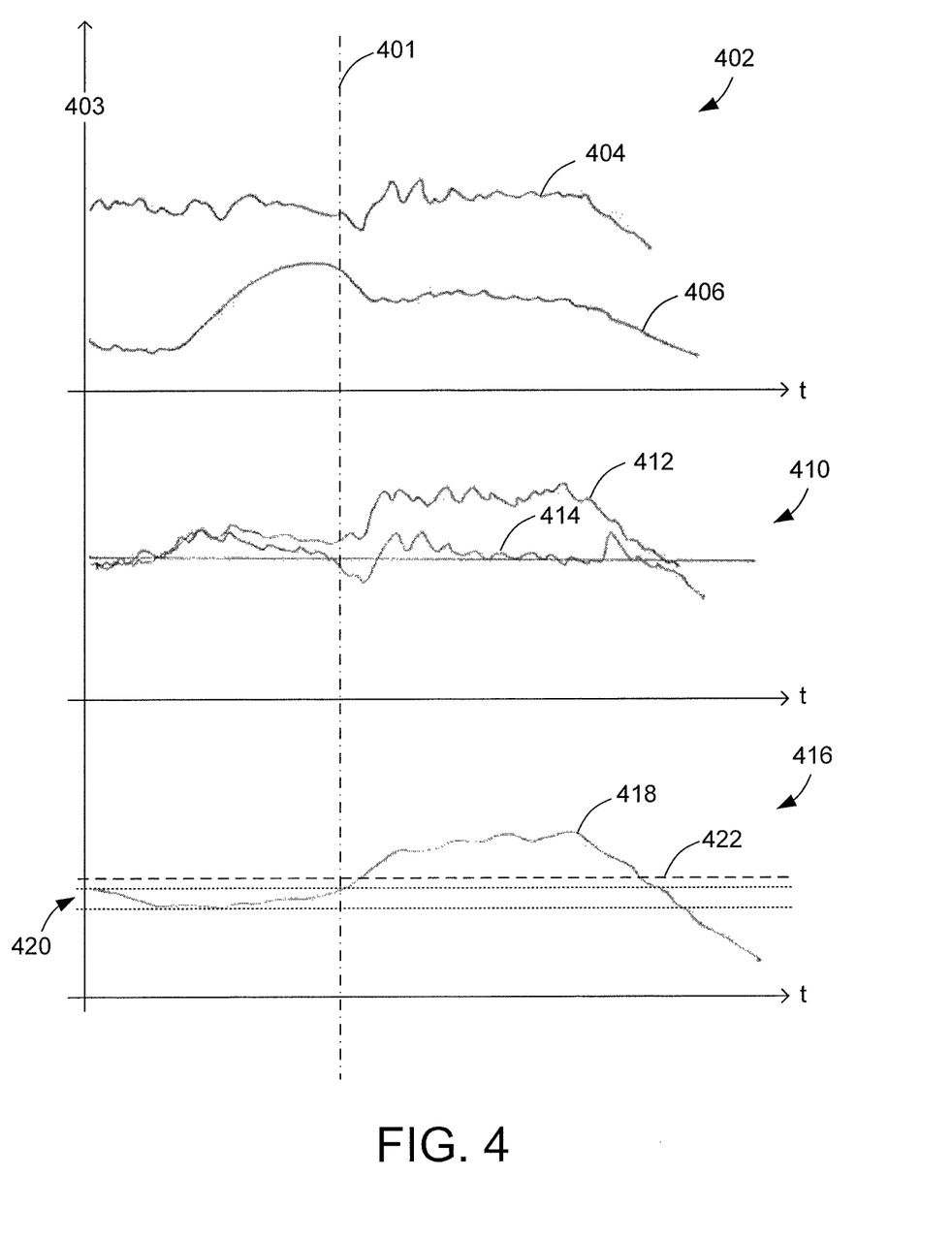
FIG. 4 is a graphical representation in accordance with the disclosure.

A graphical representation of various parameters relevant to TOS changes is shown in FIG. 4. The TOS changes indicated herein were acquired during a pile hit in a wheel loader application. The pile hit occurred at a time indicated by line 401 in the graph. The graph includes three sets of curves that are shown in time-aligned fashion for illustration. A first graph 402 includes two curves illustrative of the input and output speeds of the transmission 208 (FIG. 2)—an input speed curve 404 indicating the input speed of the transmission and an output speed curve 406 indicating an output speed of the transmission, which are plotted on a vertical axis 403 with respect to time, t. As shown, the input speed may be a speed of the input shaft 210 or the engine shaft 204, as measured by speed sensor 238. The output speed may be provided by any appropriate parameter, such as a speed of the transmission output shaft 212, the ground speed of the machine and other parameters. As can be seen from the graph, at the time indicated by line 401 when initiation of the pile hit occurs, the input speed 402 dips, which is consistent with an engine underspeed, and the output speed begins to fall, which is consistent with machine deceleration as the bucket becomes buried into the pile.

A second graph 410 illustrates time trace curves of two independent acceleration calculations discussed above. More particularly, a first curve 412 is acquired from the calculated torque feedback received at the transmission controller 250 (FIG. 2), and represents the acceleration or deceleration that is estimated to be present at the output shaft of the transmission. Here, a calculation has been made to transform the torque value estimated by the controller into a rate of change of TOS by applying an estimated machine inertia to produce the illustrated TOS values. As can be appreciated, the estimated or feedback torque calculation increases after the pile hit is initiated because the machine is forced to decelerate. It is this torque that acts to slow engine rotation and potentially stall the engine. The torque after the pile hit is initiated is provided by the friction of the machine wheels as they push the machine bucket against the pile, and the resistance the pile provides to the machine.

A second curve 414 represents the rate of change of TOS as calculated on the basis of a transmission output speed measurement. As can be seen from the second graph 410, the second torque curve 414 indicates a sharp deceleration of the machine or transmission output speed after the machine encounters the pile, and then hovers at around zero as machine speed settles.

A third graph 416 illustrates the error or difference 418 between the first and second curves 412 and 414, which in the graph has been filtered, for example, using a moving average, for illustration. As it can be seen from the graph, the difference 418 between the first and second curves 412 and 414 hovers within an expected range 420, which is denoted by two dotted-lines, until the pile hit event occurs. Following the pile hit, the difference 418 begins increasing and surpasses a threshold error value 422, which is denoted with a dashed line. The error then steadies for a while, which substantially coincides with the end of machine deceleration as it pushes the bucket into the pile.

Although one exemplary pile hit is illustrated in the graphs shown in FIG. 4, the data illustrated herein may change depending on various factors such as the density and size of the pile, the material of the pile, ground traction of the machine, initial speed of the machine, weight of the machine and other factors. However, the qualitative behavior of the machine and analysis of the various parameters as outlined herein can be used to consistently detect and address transient torque changes by implementing the comparison of the two independent acceleration determinations as discussed herein.

Figure 5:
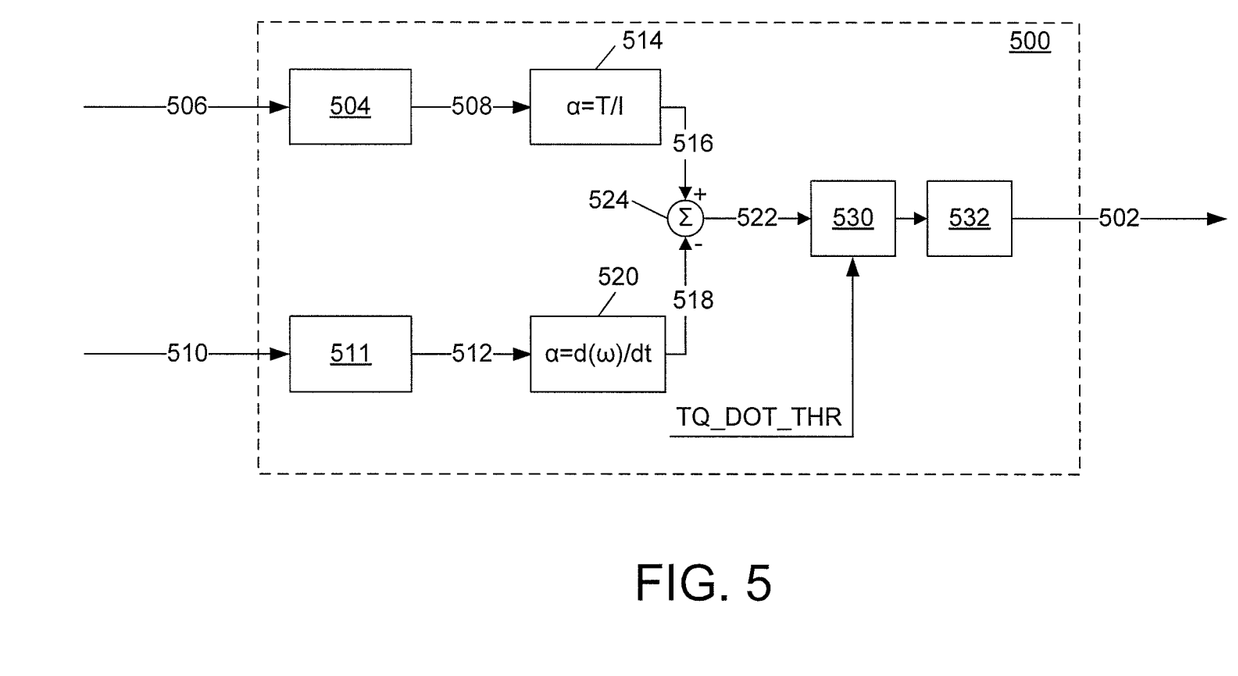
FIG. 5 is a block diagram for a controller in accordance with the disclosure.

One exemplary application is shown in the block diagram of FIG. 5, where a controller 500 that is configured to detect torque transient events in a CVT transmission is shown. The controller 500 is disposed to receive various operating parameters as inputs, and provide a transient torque indication 502 as an output. The transient torque indication 502 can be an analog or digital-type signal that can be provided to the engine controller 232 (FIG. 2) and/or to other controllers in the machine to signal that a change in operation is occurring or is about to occur such that, for example, engine speed can be reduced to avoid engine underspeed, disengagement of transmission gears can be implemented in anticipation of machine stoppage, the control sensitivity to operator inputs, which are anticipated will be to reduce transmission torque shortly after the pile hit, is increased, and others.

The controller 500 includes a first filter function 504, which receives a torque feedback signal 506 as an input. The torque feedback signal 506 may be provided from a different control module within the transmission controller 250 and represent a calculated torque provided at the output of the transmission 208 (FIG. 2) in real time, which is used as part of a closed loop torque control scheme for the transmission. In one embodiment, a determination of the torque, T, at the output of the transmission may be based on a calculation encompassing the then current engine speed and load, transmission gear setting, variator setting and other parameters indicative of the torque input to the transmission as well as the gear reduction ratio applied overall to the transmission. At the output of the first filter function 504, which is optional, a first torque value 508 is provided.

The controller 500 further includes a TOS sensor input 510. The TOS sensor input 510 may be acquired from a speed sensor disposed to measure a parameter that is related to the output speed of the transmission, and provide a signal to the controller 232 or to the transmission controller 250 that is indicative of that speed. In one embodiment, the TOS sensor input 510 may be provided from the ground speed sensor 246 (FIG. 2), which passes through a conversion function 511 that filters the signal and adjusts its value, for example, taking under consideration the gear reduction ratio through various powertrain components, in real time, to provide an angular speed, $\omega$, 512 of the output shaft of the transmission.

The first torque value 508 is provided to a function 514, which in the illustrated embodiment calculates a first acceleration, $\alpha$, based on the torque, T, and the inertia of the machine, I, in accordance with an appropriate equation such as $\alpha = T/I$. The inertia, I, can be a constant value or may alternatively be calculated based on a machine weight that has been adjusted based on the loading of the machine. The first acceleration 516 is provided from the function 513. Similarly, a second acceleration 518 is calculated as a derivative of the angular speed 512 in a function 520, which in a simplified form can be expressed as $\alpha = d(\omega)/dt$. A difference 522 between the first and second accelerations 516 and 518 is calculated or otherwise determined at a summing junction 524. The difference 522 can be a positive or negative real number, which is expected to be within a normal range of values when no abrupt changes to the torque passing through the transmission are occurring.

In one embodiment, an absolute value of the difference 522 is calculated and compared to a threshold value, TQ_DOT_THR, at a comparator function 530. Alternatively, the function 520 may be a derivative calculation function that calculates the derivative or, stated differently, quantifies changes in the difference 522 over time. In such embodiment, the rate of change of the difference may be compared to the TQ_DOT_THR, which now would represent a rate of change threshold. When the absolute value of the difference, or the rate of change of the difference, is less than or equal to the threshold value TQ_DOT_THR, normal transmission operation is carried out. However, when the absolute value of the difference is greater than the threshold value TQ_DOT_THR, the value of the transient torque indication is changed at a transient detection trigger function 532. In one embodiment, the trigger function 532 may provide a digital signal where zero indicates the absence of a transient change and one indicates the presence of a transient change. In an alternative embodiment, the output of the trigger function 532 may be configured as a factor, which is scaled depending on the severity of the transient event as indicated by the magnitude or rate of change of the difference 522. In this way, a factor of one may be provided when no transient is present, which factor can be increased in a predetermined fashion depending on the extend of the transient change. Thereafter, as previously described, transmission torque control may be carried out with increased sensitivity while the transient condition is present. In one embodiment, the increased transmission torque control sensitivity includes adjust engine control at the engine controller 232 to ensure that engine speed is maintained above a threshold engine speed value. In other words, the detection of a transient may, in part, be used to signal a change in an acceptable engine underspeed setpoint in the engine controller.

INDUSTRIAL APPLICABILITY

The present disclosure is applicable in improving the operation and sociability of vehicles and machines having CVTs that operate in a torque-controlled fashion. Disclosed herein are systems and methods for effectively detecting torque transients using two independent torque indications. In contrast to known systems, which depend on the detection of transients using an operator input, the use of two independent parameters for the detection in the disclosed system makes the determination more robust and less dependent on any variability in the control of the machine that can occur with different operators. Moreover, insofar as torque transients may affect machine and vehicle operation in many different contexts, for example, when a wheel loader encounters a pile or when a wheel of a passenger car hits a curb, the disclosed systems and methods have broad applicability to many other types of machines, vehicles and powertrains in addition to those already described above.

Figure 6:
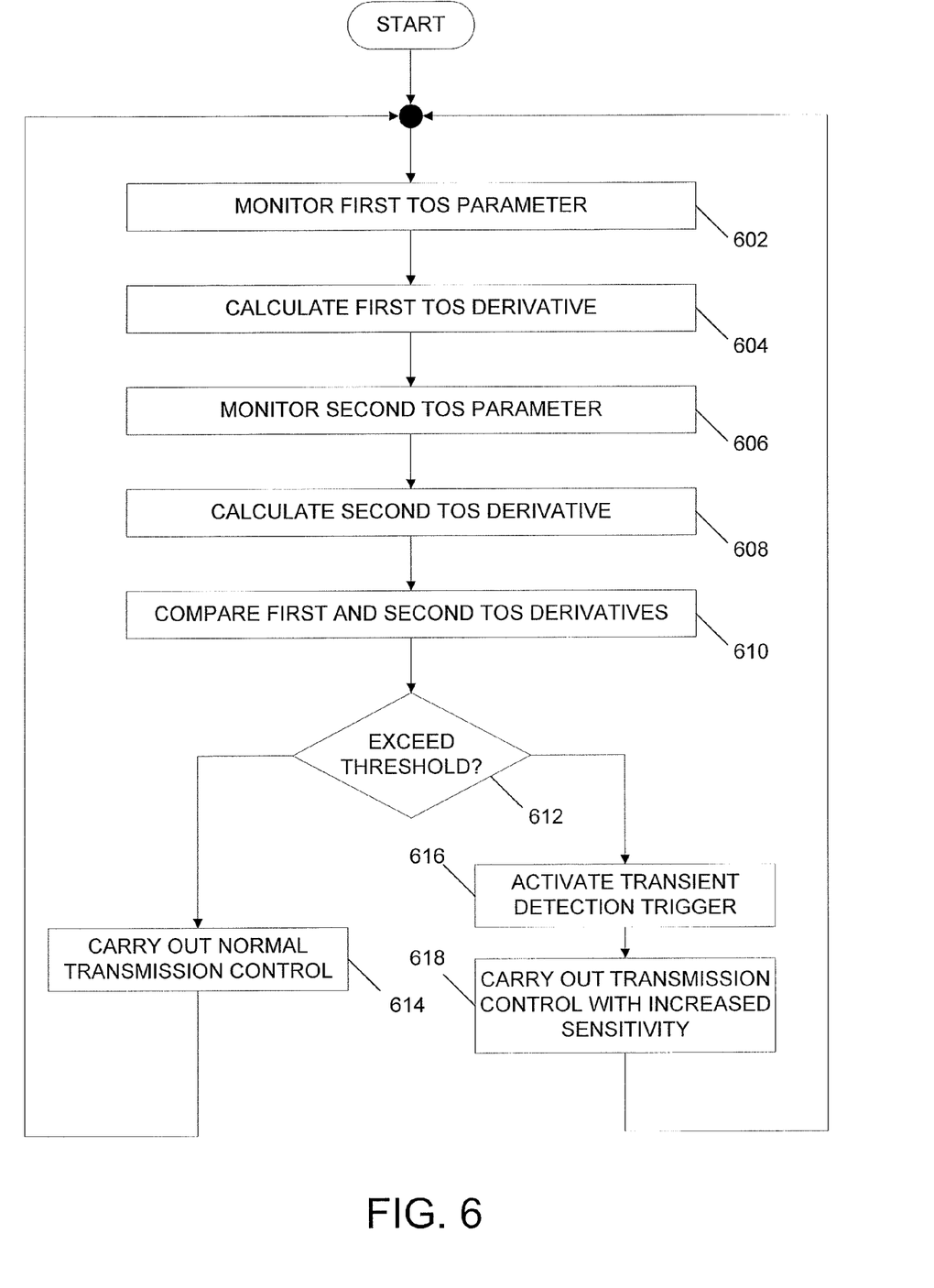
FIG. 6 is a flowchart for a method in accordance with the disclosure.

A flowchart for a method of detecting a transient event in a machine powertrain is shown in FIG. 6. The method includes monitoring a first transmission output speed (TOS) parameter at 602, and calculating a derivative thereof that is indicative of a first acceleration at 604. The first TOS acceleration may be a value derived from a related parameter, for example, an estimated torque parameter of the transmission that is used for transmission control. In this case, the TOS is an angular or shaft speed of a transmission output shaft, which can be measured directly by use of a sensor or can be otherwise derived from related parameters such as a ground speed of the machine. A second parameter is monitored at 606, and a second acceleration is calculated at 608. The second parameter may be a torque feedback of the transmission, which is used to calculate a second acceleration parameter by using machine inertia, which can be estimated or presumed to be a constant. The first and second TOS acceleration parameters, which are independent from one another, are compared at 610, and a determination of whether the divergence between them exceeds a threshold value is made at 612. When the divergence is below the threshold, normal transmission operation is carried out at 614. When and while the divergence between the derivatives of the first and second torque parameters exceeds the threshold value, a transient detection trigger is activated at 616 and transmission control with increased sensitivity is carried out at 618.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A powertrain having an engine connected to a transmission adapted to drive ground engaging members, comprising:
   a transmission output speed (TOS) sensor disposed to provide a signal indicative of a speed of an output of the transmission;
   a controller configured to control operation of the transmission based on a desired torque output of the transmission by, at least in part, estimating an actual torque output of the transmission and using the actual torque estimation as a control feedback;
   wherein the controller is further configured to:
      determine, in real time, a first TOS acceleration based on the signal provided by the transmission output speed sensor,
      determine a second TOS acceleration based on the actual torque estimation that is used as a control feedback;
      determine a divergence between the first and second TOS accelerations; and
      activate a torque transient trigger that is used to further control operation of the transmission when the divergence exceeds a threshold value.

2. The powertrain of claim 1, wherein the actual torque estimation is independent of the TOS sensor signal.

3. The powertrain of claim 1, wherein the controller is further disposed to address transient torque changes of the powertrain such that engine underspeed is avoided by increasing a control sensitivity to an operator input when the ground engaging members encounter an obstacle.

4. The powertrain of claim 1, wherein the divergence is determined by calculating a difference between the first and second TOS accelerations, and thereafter comparing at least one of the difference and a rate of change of the difference with the threshold value.

5. The powertrain of claim 1, wherein calculating the first acceleration involves calculating a derivative of the signal in real time.

6. The powertrain of claim 1, wherein calculating the second acceleration includes estimating an inertia of a machine into which the powertrain is operating.

7. The powertrain of claim 1, wherein the transmission is a continuously variable transmission that includes a variator that is responsive to control signals from the controller, and wherein activation of the torque transient trigger operates to increase a control sensitivity of the controller relative to providing the control signals to the variator.

8. A machine, comprising:
   a frame that supports an engine connected to a transmission, the transmission selectively transforming an input engine speed and engine torque to an output transmission speed and transmission torque, the transmission speed and torque being applied to a set of ground engaging members to propel the frame;
   a transmission output speed (TOS) sensor disposed to provide a signal indicative of a speed of an output of the transmission;

a controller configured to control operation of the engine and the transmission based on a desired torque output of the transmission by, at least in part, estimating an actual torque output of the transmission and using the actual torque estimation as a control feedback;

wherein the controller is further configured to:
determine, in real time, a first TOS based on the signal provided by the TOS sensor,
calculate a first acceleration based on the first TOS;
determine a second acceleration based on at least one of engine speed, engine torque, machine inertia, and on a transmission setting;
determine a divergence between the first and second accelerations;
calculate a rate of change of the divergence between the first and second accelerations; and
when the rate of change of the divergence exceeds a threshold value, adjust a control parameter that adjusts the transmission setting to avoid a decrease in engine speed below a threshold engine speed value.

9. The machine of claim 8, wherein the actual torque estimation is not dependent on the TOS sensor signal.

10. The machine of claim 8, wherein the controller is further disposed to address transient torque changes of the powertrain such that engine underspeed is avoided by increasing a control sensitivity to an operator input when the ground engaging members encounter an obstacle.

11. The machine of claim 8, wherein the divergence includes a difference calculation.

12. The machine of claim 8, wherein calculating the first acceleration includes calculating a differential of the first TOS.

13. The machine of claim 8, wherein calculating the second acceleration includes estimating the machine inertia.

14. The machine of claim 8, wherein the transmission is a continuously variable transmission that includes a variator that is responsive to control signals from the controller, and wherein activation of the torque transient trigger operates to increase a control sensitivity of the controller relative to providing the control signals to the variator.

15. A method for operating an electronic controller for detecting transient torque changes in a torque-controlled transmission, the electronic controller configured to control operation of the torque-controlled transmission, the method comprising:
operating the electronic controller to monitor a transmission output speed (TOS) sensor signal indicative of an output speed of the transmission;
determining a first TOS acceleration by calculating a derivative of the measured TOS in the electronic controller based on the TOS sensor signal;
operating the electronic controller to estimate a torque at an output of the transmission;
operating the electronic controller to determine a second TOS acceleration by dividing the estimated torque by a predetermined inertia of the machine using the electronic controller;
comparing the first and second TOS accelerations in the electronic controller and, when a parameter based on a difference between the first and second TOS accelerations exceeds a threshold value, causing the electronic controller to activate a torque transient change trigger.

16. The method of claim 15, wherein monitoring the TOS of the transmission includes acquiring and analyzing a speed sensor signal disposed at an output shaft of the transmission and configured to provide a signal indicative of the TOS.

17. The method of claim 15, wherein the parameter based on the difference between the first and second TOS accelerations is one of a derivative of the difference and a filtered error signal that is determined by subtracting a time-delayed value of the difference from the difference.

18. The method of claim 15, wherein the estimated torque at the output of the transmission is independent of the TOS.

19. The method of claim 15, wherein the torque transient trigger is one of a digital signal and a factor that is correlated to the difference.

20. The method of claim 15, wherein the predetermined inertia of the machine is determined based on a known machine inertia and further based on a loading estimation of the machine.

* * * * *